Patented Aug. 22, 1944

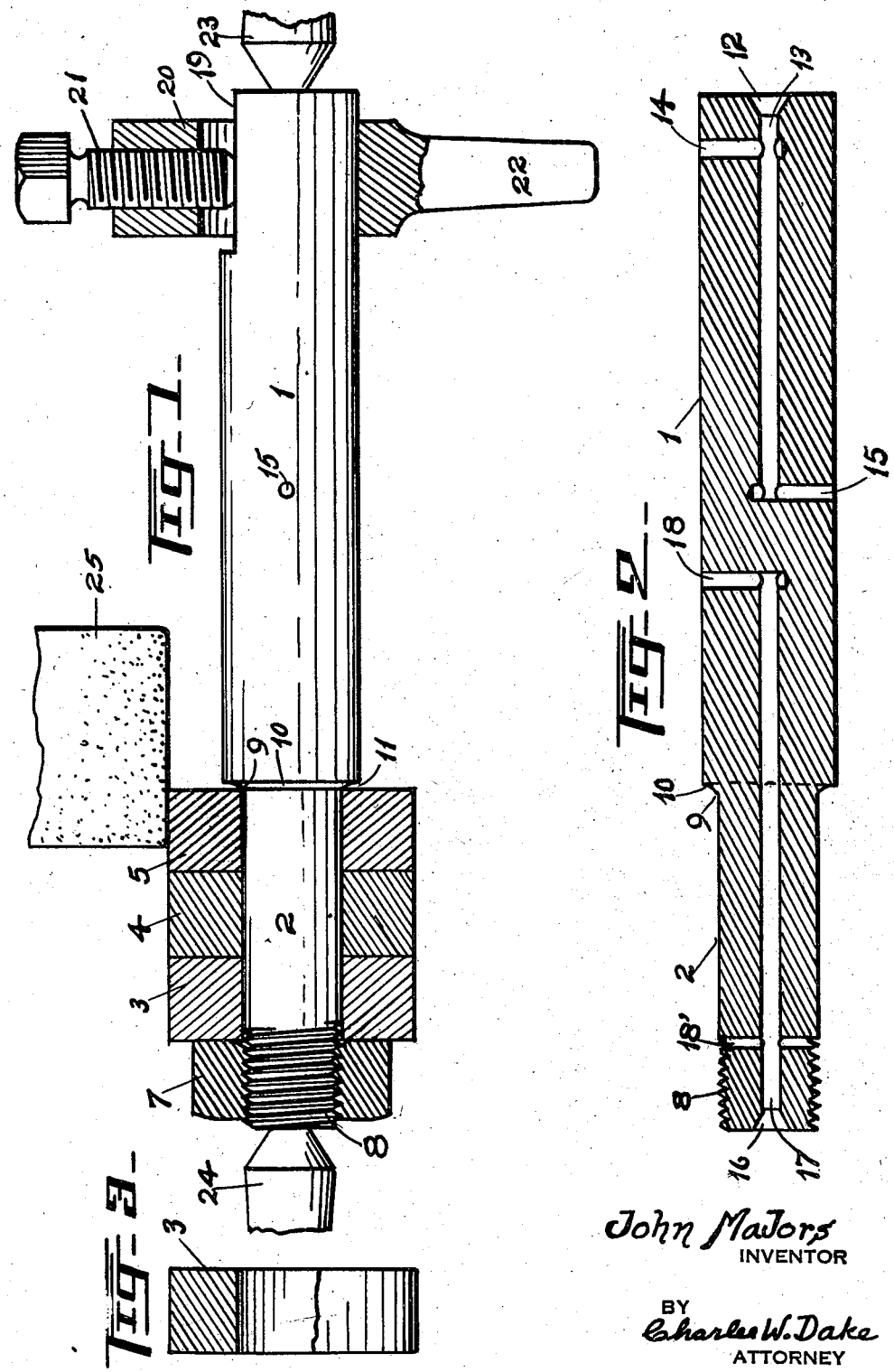

2,356,678

UNITED STATES PATENT OFFICE 2,356,678

MANDREL

John Majors, Muskegon, Mich.

Application April 21, 1943, Serial No. 483,896

1 Claim. (Cl. 51—237)

My present invention relates to improvements in mandrels, and particularly to mandrels employed in the precision grinding of hardened steel cylindrical rings and rollers. The objects of improvement are: First, to provide a mandrel whereby hardened steel rings and rollers can be ground to extremely small tolerances. Second, to provide a mandrel that will not warp while hardened steel rings or rollers are being ground thereon. Third, to provide a mandrel that will not become overheated while hardened steel rings or rollers are being ground thereon. Fourth, to provide a mandrel that will remain cool during the grinding of hardened steel rings or rollers. Fifth, to provide a mandrel that will not bend by reason of holding hardened steel rings or rollers thereon. Sixth, to provide a mandrel for grinding hardened steel rings or rollers that will be simple to use and readily understood.

I attain these named objects by the mandrel illustrated in the accompanying drawing, in which Figure 1 is a longitudinal view of the mandrel mounted between centers of a grinder machine; the view showing a plurality of hardened steel rollers mounted thereon for grinding their periphery, the nut by which the rollers are secured on the mandrel, the grinding wheel by which the rollers are ground, and the dog for rotating the mandrel during the grinding of the rollers.

Figure 2 is a longitudinal sectional view of the mandrel, and, by reason of its section, shows the cooling ducts within the mandrel.

Figure 3 is a part sectional view of one of the hardened steel rollers mounted on the mandrel as shown in Figure 1.

In the drawing, similar numerals refer to similar parts or portions associated with the present invention and referring thereto.

Numeral 1 refers to the largest diameter of the mandrel; numeral 2, the cylindrical portion on which the hardened steel rollers 3, 4, and 5 are mounted and held for grinding by the nut 7 engaging screw threads 8 and forcing one of the rollers against the smaller junctural edge 9 of the concave shoulder 10 which is separated from the roller 5 by annular gap 11. Numeral 12 refers to a counterbore at the end of the mandrel portion 1 and from which extends cooling fluid bore 13 having port 14 extending to the periphery of the larger diameter portion near its end, and port 15 extending to the periphery of the said larger portion in spaced apart relation to the port 14 and at the diametrical opposite side of the mandrel. At the opposite end of the mandrel from the counterbore 12 is a similar counterbore 16 from which extends bore 17 to near the port 15 where port 18 extends from the bore to the periphery of the larger portion of the mandrel. Numeral 19 refers to a flat surface machined on the larger diameter portion of the mandrel and whereby the lathe dog 20 may be secured to the mandrel by set screw 21. Numeral 22 refers to the radially extending leg of the lathe dog 20, its purpose being to engage a stud extending from the lathe head or flange for rotating the mandrel which is held between lathe centers 23 and 24.

Referring to the mandrel and its mode of employment: First, a bar of suitable high carbon content steel is provided in an annealed state, and having provided the said steel bar, it is roughly machined externally to the diameters of the portions 1 and 2 with counterbores in each of its ends. The bores 13 and 17 are then drilled into the roughly machined mandrel and the ports 14, 15, and 18 with screw threads 8 are drilled from the periphery to the bores 13 and 17. The mandrel having been machined as described, it is hardened by heating to a temperature exceeding the critical temperature of the steel employed, and quenched in either water or oil, after which the roughly machined mandrel is mounted between lathe centers where it is rotated and ground to certain tolerances of which the portion 2 is ground within two ten thousandths of an inch of the desired diameter. In grinding the portion 2, the grinding wheel is so dressed as to produce the roller contact edge 9 with the annular concave shoulder extending from said edge to the periphery of the portion 1 and thereby producing the annular gap 11. Having provided a plurality of hardened steel rollers with bores closely fitting the portion 2, the rollers are mounted on said portion 2 and drawn or forced by nut 7, loosely machined to the screw threads 8, against the edge 9 and the mandrel together with the rollers mounted thereon is mounted in a lathe and rotated at a suitable speed, after which the rotating grinding wheel is fed longitudinally of the mandrel and rollers and thereby grinds the rollers to substantially exact size or within the tolerance permitted.

While the operation of grinding the outer periphery of hardened steel rings or rollers is taking place, water or other cooling fluid is projected against the rings or rollers and grinding wheel at their points of contact in such quantity that a portion of the cooling fluid is deflected onto the portion 1 of the mandrel with such force that a portion of the cooling fluid is forced into the port 15 and therefrom through the bore 13 and out of the port 14; likewise a portion of the cooling fluid is forced into the port 18 and through bore 17, and out of port 18' to and past the screw threads 8 having nut 7 loosely fitted on said screw threads. The cooling fluid flowing in bore 13 is prevented from escaping from the bore at its end by lathe center 23 extending into the counterbore 12, and the cooling fluid flowing in bore 17 is prevented from escaping from the bore by lathe center 24; the cooling fluid in said bores 13 and 17 forms a lubricant for the lathe centers when both the centers 23 and 24 are stationary, but only for the lathe center 24 when the lathe center 23 rotates with the lathe spindle and the mandrel.

In certain cases it has been found that the bore 17 with its connecting ports 18 and 18' are not necessary, but that the bore 13 with its connecting ports 14 and 15 are necessary in order to cool the mandrel and prevent warping or bending of the mandrel which is detrimental to precision grinding of the hardened steel rings or rollers to produce the necessary small tolerance in diameter and excentricity required.

I am aware that, prior to my present invention, mandrels have been made and employed in connection with grinding cylindrical members. I therefore do not claim a mandrel broadly; but I claim:

In a mandrel for use in grinding a plurality of rollers and the like, and having a plurality of different diameters with a concave shoulder at the juncture of two of the diameters for engaging one of the rollers and a bore extending longitudinally of the mandrel and axially thereof with ports extending therefrom to the periphery of two of the diameters of the mandrel in spaced apart relation to each other.

JOHN MAJORS.